(12) United States Patent
Montaner Mas et al.

(10) Patent No.: US 12,248,409 B2
(45) Date of Patent: Mar. 11, 2025

(54) APPARATUS AND METHOD OF CONTROLLING ACCESS TO DATA STORED IN A NON-TRUSTED MEMORY

(71) Applicant: Arm Limited, Cambridge (GB)

(72) Inventors: Hector Montaner Mas, Cambridge (GB); Andreas Lars Sandberg, Cambridge (GB); Roberto Avanzi, Cambridge (GB)

(73) Assignee: Arm Limited, Cambridge (GB)

( * ) Notice: Subject to any disclaimer, the term of this patent is extended or adjusted under 35 U.S.C. 154(b) by 140 days.

(21) Appl. No.: 17/756,877

(22) PCT Filed: Nov. 12, 2020

(86) PCT No.: PCT/GB2020/052882
§ 371 (c)(1),
(2) Date: Jun. 3, 2022

(87) PCT Pub. No.: WO2021/116655
PCT Pub. Date: Jun. 17, 2021

(65) Prior Publication Data
US 2023/0113906 A1   Apr. 13, 2023

(30) Foreign Application Priority Data
Dec. 10, 2019   (GB) .................................... 1918126

(51) Int. Cl.
*G06F 12/00* (2006.01)
*G06F 12/0866* (2016.01)
*G06F 12/14* (2006.01)

(52) U.S. Cl.
CPC ...... *G06F 12/1458* (2013.01); *G06F 12/0866* (2013.01); *G06F 12/1441* (2013.01)

(58) Field of Classification Search
CPC ............. G06F 12/1458; G06F 12/0866; G06F 12/1441; G06F 21/78; G06F 21/64; G06F 12/1408; H04L 9/3242
See application file for complete search history.

(56) References Cited

U.S. PATENT DOCUMENTS

2006/0123250 A1   6/2006   Maheshw et al.
2008/0172562 A1   7/2008   Cachin et al.
(Continued)

OTHER PUBLICATIONS

Elbaz, R., Champagne, D., Gebotys, C., Lee, R.B., Potlapally, N., Torres, L. (2009). Hardware Mechanisms for Memory Authentication: A Survey of Existing Techniques and Engines. (Year: 2009).*
(Continued)

*Primary Examiner* — Arvind Talukdar
(74) *Attorney, Agent, or Firm* — NIXON & VANDERHYE P.C.

(57) ABSTRACT

An apparatus including memory access circuitry for controlling access to data stored in the non-trusted memory, and memory security circuitry to verify integrity of data stored in the non-trusted memory. The memory security circuitry has authentication code generation circuitry for generating authentication codes to be associated with the data stored in the non-trusted memory, for use when verifying the integrity of the data. The apparatus also has a trusted storage, and the authentication code generation circuitry is arranged to generate different authentication codes, dependent on whether the authentication code is to be stored in the non-trusted memory or the trusted storage.

20 Claims, 9 Drawing Sheets

(56) References Cited

U.S. PATENT DOCUMENTS

| | | | |
|---|---|---|---|
| 2010/0042824 A1* | 2/2010 | Lee | H04L 9/0894 |
| | | | 713/168 |
| 2011/0145600 A1* | 6/2011 | Rudelic | G06F 21/79 |
| | | | 713/193 |
| 2014/0380124 A1 | 12/2014 | Grube et al. | |
| 2017/0147356 A1 | 5/2017 | Kotary et al. | |
| 2017/0289151 A1 | 10/2017 | Shanahan et al. | |
| 2019/0042475 A1* | 2/2019 | Ghosh | H04L 9/0643 |

OTHER PUBLICATIONS

Elbaz, R., Champagne, D., Lee, R.B., Torres, L., Sassatelli, G., Guillemin, P. (2007). TEC-Tree: A Low-Cost, Parallelizable Tree for Efficient Defense Against Memory Replay Attacks. (Year: 2007).*

Reouven Elbaz, et al., "Hardware Mechanisms for Memory Authentication: A Survey of Existing techniques and Engines", Jan. 1, 2009 (Jan. 1, 2009), Big Data Analytics in the Social and Ubiquitous Context : 5th International Workshop on Modeling Social Media, MSM 2014, 5th International Workshop on Mining Ubiquitous and Social Environments, MUSE 2014 And First International Workshop on Machine Le, XP019116441, ISBN: 978-3-642-17318-9; paragraph [0003]; figure 3.

Shay Gueron, "A Memory Encryption Engine Suitable for General Purpose Processors", IACR, International Association for Cryptologic Research, vol. 20160225:211316, Feb. 25, 2016 (Feb. 25, 2016), pp. 1-14, XP061020412, [retrieved on Feb. 25, 2016] paragraph [0002]-paragraph [0003]; figures 1,2.

* cited by examiner

APPARATUS AND METHOD OF CONTROLLING ACCESS TO DATA STORED IN A NON-TRUSTED MEMORY

BACKGROUND

The present technique relates to memory security, and more particularly to an apparatus and method for controlling access to data stored in a non-trusted memory.

Some data processing systems may need to run software which involves the processing of secret or sensitive information which should not be exposed to a potential attacker. However, providing enough capacity to store all such information in a memory which cannot be tampered with by an attacker may be infeasible, and so sometimes it may be necessary to export some sensitive information to a memory which is vulnerable to attack. For example, whilst data stored on-chip may be secure against attacks, on-chip memory storage may be limited and so it may be required to write data to an off-chip external memory. An attacker may be able to read data from the external memory or intercept the data as it is passed to the external memory, and/or tamper with data values stored in the external memory in an attempt to cause incorrect behaviour when such externally stored data is subsequently brought back into the processing system.

To provide security for data stored in a potentially unsafe memory, authentication codes may be generated in association with the data, which are then referenced when performing verification to check, when data is read from the unsafe memory, that the data has not been modified since it was stored to the memory. Whilst the authentication codes are smaller than the data they are being used to authenticate (for example 64 to 128 bits for a 64 byte block of data), they need to be large enough to inhibit the likelihood of collisions that could be exploited by an attacker, a collision occurring where two different data values produce the same authentication code. Otherwise, on a collision, an attacker monitoring the non-trusted memory could replace a current value with a different one and thus corrupt memory, as the verification performed using the authentication code would result in a false positive (i.e. the verification would be passed even though the data was different).

Thus, the size of the set of authentication codes used in association with the data stored in the non-trusted memory is typically larger than can be stored on-chip, and hence may also be stored in the non-trusted memory. To increase performance, a limited number of the authentication codes that are likely to be used in the future may be stored in a trusted storage, such as an on-chip cache, where the access time is smaller than would be the case were the authentication codes accessed in the non-trusted memory. However, the size of such a trusted storage is typically relatively small, and it would be desirable to make more effective use of that trusted storage.

SUMMARY

In a first example arrangement, there is provided an apparatus comprising: memory access circuitry to control access to data stored in a non-trusted memory; memory security circuitry to verify integrity of data stored in the non-trusted memory; and a trusted storage; the memory security circuitry having authentication code generation circuitry to generate authentication codes to be associated with the data stored in the non-trusted memory, for use when verifying the integrity of the data; wherein the authentication code generation circuitry is arranged, for a given block of data for which an associated authentication code is to be generated, to generate as the associated authentication code a first authentication code with a first size when the associated authentication code is to be stored in the non-trusted memory, and to generate as the associated authentication code a second authentication code with a second size less than the first size when the associated authentication code is to be stored in the trusted storage.

In a second example arrangement, there is provided a method of controlling access to data stored in a non-trusted memory, comprising: employing authentication code generation circuitry to generate authentication codes to be associated with the data stored in the non-trusted memory; verifying the integrity of the data with reference to the authentication codes; providing a trusted storage; and arranging the authentication code generation circuitry, for a given block of data for which an associated authentication code is to be generated, to generate as the associated authentication code a first authentication code with a first size when the associated authentication code is to be stored in the non-trusted memory, and to generate as the associated authentication code a second authentication code with a second size less than the first size when the associated authentication code is to be stored in the trusted storage.

In a still further example arrangement, there is provided an apparatus comprising: memory access means for controlling access to data stored in a non-trusted memory; memory security means for verifying integrity of data stored in the non-trusted memory; and a trusted storage; the memory security means having authentication code generation means for generating authentication codes to be associated with the data stored in the non-trusted memory, for use when verifying the integrity of the data; wherein the authentication code generation means is responsive to a given block of data for which an associated authentication code is to be generated, for generating as the associated authentication code a first authentication code with a first size when the associated authentication code is to be stored in the non-trusted memory, and for generating as the associated authentication code a second authentication code with a second size less than the first size when the associated authentication code is to be stored in the trusted storage.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
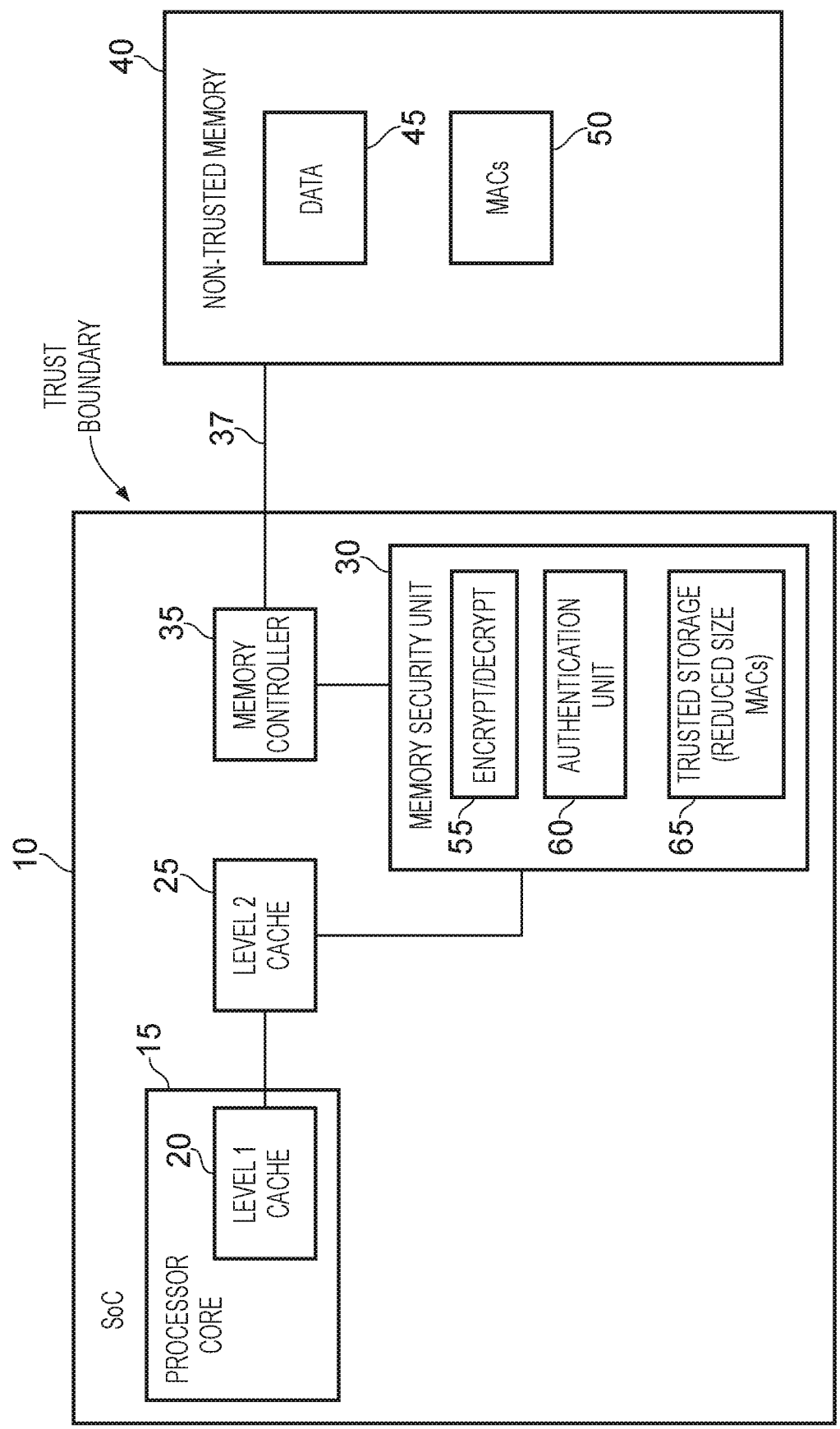
FIG. 1 is a block diagram schematically illustrating an example of an apparatus having memory security circuitry for verifying integrity of data stored in a non-trusted memory.

In accordance with one example implementation, an apparatus is provided that has memory access circuitry for controlling access to data stored in a non-trusted memory, and memory security circuitry for verifying integrity of data stored in the non-trusted memory. The memory security circuitry has authentication code generation circuitry to generate authentication codes to be associated with the data stored in the non-trusted memory, for use when verifying the integrity of the data.

A trusted storage is also provided, which will typically be of a significantly smaller capacity than the non-trusted memory. The trusted storage can take a variety of forms, but could for example be a cache storage. Typically, this may be used to cache a subset of the information stored in the non-trusted memory. Hence, whilst the authentication codes generated by the authentication code generation circuitry might normally be stored in non-trusted memory, a subset of those authentication codes could be stored in the trusted storage. However, the inventors of the present technique realised that a more effective usage of the trusted storage could be achieved than is achievable by merely using the trusted storage to cache a subset of the authentication codes stored in the non-trusted memory. In particular, as mentioned earlier, the authentication codes are typically made large enough to inhibit the prospect of collisions being exploited by an attacker. Otherwise, an attacker can implement a replacement attack whereby data stored in memory is replaced with different data that produces the same authentication code, and hence passes the verification check.

However, the inventors noted that as an attacker cannot read the contents of the trusted storage, the attacker is therefore not aware of possible collisions and, in turn, the exact time at which a replacement attack should be performed. As such, when the verification check employs authentication code information stored in the trusted storage, the only chance an attacker has to implement a replacement attack is to blindly replace a data value in memory and hope for an authentication code collision. Such an attack has a $\frac{1}{2}^i$ probability of success where i is the bit size of the authentication code. Moreover, the attacker will typically only have a single attempt, as a detected memory corruption will trigger an emergency procedure that typically aborts the affected process.

Accordingly, whilst the fact that the overall set of authentication codes will typically be too large to store in trusted storage results in the need to store the authentication codes in non-trusted memory, and this in turn generally dictates that the authentication codes are of a size that effectively makes the chance of collision small enough to inhibit an attacker's ability to perform a replacement attack, the inventors realised that when the authentication codes are stored in the trusted storage they no longer need to be as large as they are when stored in non-trusted memory. Hence, rather than merely using the trusted storage to cache copies of a subset of the authentication codes generated to store in the non-trusted memory, in accordance with the techniques described herein the authentication code generation circuitry is arranged to generate different forms of authentication code dependent on where the authentication code is going to be stored.

In particular, the authentication code generation circuitry is arranged, for a given block of data for which an associated authentication code is to be generated, to generate as the associated authentication code a first authentication code with a first size when the associated authentication code is to be stored in the non-trusted memory, and to generate as the associated authentication code a second authentication code with a second size less than the first size when the associated authentication code is to be stored in the trusted storage. As a result, a larger number of authentication codes can be stored within the trusted storage than would be the case if the trusted storage were merely used to cache a subset of the authentication codes stored in the non-trusted memory. This can significantly reduce silicon area and power consumption within the apparatus, without compromising the effectiveness of the integrity checking performed by the apparatus. In particular, whilst reducing the size of the authentication code does increase the chance of a collision occurring, since the reduced size authentication codes are only used within the trusted storage, whose contents are not accessible to a potential attacker, the attacker is unable to make any use of this increase in the likelihood of a collision, and as mentioned earlier can only seek to perform a blind attack without any information as to the likelihood of a collision arising from that attack.

The above-mentioned first and second sizes used for the authentication codes stored in the non-trusted memory and the trusted storage, respectively, are a matter of design choice. However, purely by way of specific example, it may be the case that 64-bit first authentication codes are used in association with a 64 byte block of data when those authentication codes are stored in non-trusted memory, but the second authentication codes generated for storing in the trusted storage may be only 16 bits or 32 bits, implying a cache size reduction of 75% or 50%, respectively. Alternatively, rather than reducing the cache size, it will be appreciated that a significantly larger number of authentication codes can be stored within the trusted storage when adopting the technique described above, as compared with an approach that merely cached a subset of the authentication codes stored in the non-trusted memory.

In one example implementation the apparatus may be considered to reside with a domain to trust, and the non-trusted memory may be outside of that domain of trust. In such an arrangement, the authentication code generation circuitry may be arranged to generate the second authentication code in a manner that ensures that the second authentication code is not inferable from information residing outside of the domain of trust. In particular, to ensure that the robustness of the integrity checking process is not compromised by the use of the smaller size authentication codes within the trusted storage, it is desirable that the reduced size authentication codes are unpredictable to the potential attacker. As will be apparent from the above discussion, not only the data, but also the first authentication codes are stored within the non-trusted memory, and hence it is desirable that the second authentication codes are not predictable from knowledge of the first authentication codes.

Hence, for example, it is desirable that the second authentication codes are not merely produced by truncating the first authentication codes.

Hence, in one example arrangement, the authentication code generation circuitry is arranged to employ an authentication code generation process that is dependent on which of the first authentication code and the second authentication code is being generated, so as to ensure that the second authentication code generated for the given block of data is not inferable from visibility of the first authentication code for that given block of data.

There are a number of ways in which it can be ensured that the second authentication code is not deducible from visibility of the equivalent first authentication code. For example, in one implementation the authentication code generation process is dependent on an input item of secret data, and the authentication code generation circuitry is arranged to cause a first item of secret data to be used when generating the first authentication code and a second item of secret data to be used when generating the second authentication code, wherein the second item of secret data is different to the first item of secret data.

There are a number of ways in which the second authentication code may be generated. For example, the authentication code generation circuitry may be arranged to generate the second authentication code by applying an algorithm that uses as one input the given block of data. Hence, the second authentication code may be generated based on the block of data to which the authentication code is going to relate and the second item of secret data (i.e. the item of secret data that is different to the equivalent item of secret data that would be used were the first authentication code being generated). However, in an alternative implementation the second authentication code may be generated without reference to the given block of data. In particular, the authentication code generation circuitry may be arranged to generate the second authentication code by applying an algorithm that uses as one input the first authentication code. Hence, in such implementations, the first authentication code will always be generated, but if it is decided to store the authentication code in trusted storage, then an additional process will be employed to generate the second authentication code based on the first authentication code. It should be noted that in this instance it is still the case that the second authentication code is not inferable by the attacker from knowledge of the first authentication code, since other inputs will also be used when generating the second authentication code, such as the earlier-mentioned second item of secret data.

There are a number of ways in which the authentication code generation circuitry may generate the second authentication code of the required second size. For example, the algorithm employed to generate the second authentication code may directly generate the second authentication code of the required second size. However, in an alternative implementation the authentication code generation circuitry may be arranged to generate the second authentication code by employing an algorithm that generates an intermediate authentication code that is of the first size, and then applying a further process to produce the second authentication code of the second size from this intermediate authentication code. Hence, the algorithm used to generate the second authentication code may not itself directly produce an authentication code of the required size, but a separate process can then be used to transform the intermediate authentication code into the second authentication code of the second size. For example, the further process may be a truncation process such that the second authentication code is merely a truncated version of the intermediate authentication code.

As mentioned earlier, the trusted storage can take a variety of forms, but in one example implementation is organised as a cache to store second authentication codes for a subset of the blocks of data stored in the non-trusted memory.

When the trusted storage is organised as a cache, it will be apparent that it will sometimes be necessary to evict second authentication codes from the cache, for example to make space for new second authentication codes that have been generated. At that point, in order to avoid loss of any authentication code information, it is necessary for the equivalent first authentication code to be present in the non-trusted memory. There are a number of ways in which this can be achieved. For example, in one implementation the authentication code generation circuitry may be arranged, when generating the second authentication code to be stored in the trusted storage, to also generate the first authentication code and store the generated first authentication code in the non-trusted memory, whereby on eviction of any second authentication code from the trusted storage, the corresponding first authentication code is present in the non-trusted memory. Hence, because at the time the second authentication code was originally generated and stored in the trusted storage, the equivalent first authentication code was also generated and stored in the non-trusted memory, at the time the second authentication code is evicted it can merely be discarded without any further action being needed.

However, in an alternative implementation the authentication code generation circuitry may be arranged, when generating the second authentication code to be stored in the trusted storage, to not store the first authentication code in the non-trusted memory, and on eviction of any second authentication code from the trusted storage, the authentication code generation circuitry may be arranged to generate the corresponding first authentication code for storage in the non-trusted memory. It should be noted that, dependent on which process is used to generate the second authentication code, it may or may not be the case that the first authentication code is generated as part of the process of generating the second authentication code. However, in accordance with this example implementation, even if the first authentication code is generated as part of the process of generating the second authentication code, the first authentication code will not be retained once the second authentication code has been generated and stored in the trusted storage, and accordingly the first authentication code will need to be regenerated at the time of eviction. As the first authentication code cannot be regenerated from the second authentication code, the related data block has to be read from non-trusted memory to generate the first authentication code that will be stored in the non-trusted memory. Note that the success of this generation process is subject to the validation of the integrity of the read data block. To perform this validation, a second authentication code will be recreated from the read data block and then compared against the second authentication code that is about to be evicted. If this validation is successful, the eviction process can complete by dropping the evicted second authentication code and storing the validated first authentication code in non-trusted memory.

In one example implementation, the memory security circuitry is arranged, when reading a block of data from the non-trusted memory, to determine whether the associated authentication code is stored as a second authentication code in the trusted storage, and if so to verify the integrity of the read block of data using the second authentication code in the trusted storage. Conversely, if it is determined that the associated authentication code is not stored as a second authentication code in the trusted storage, the memory security circuitry can be arranged to retrieve the first authentication code from the non-trusted memory and then employ the retrieved first authentication code when verifying the integrity of the read block of data.

Whilst in one example implementation, the memory security circuitry can include verification check components that can perform verification checks based on either first authentication codes or second authentication codes, in an alternative implementation the memory security circuitry may be arranged so that the checks are always performed with reference to second authentication codes. This approach can for example be adopted when the authentication code generation circuitry is arranged to generate the second authentication code using the first authentication code as an input. In particular, in one example arrangement the memory security circuitry may be arranged to employ the authentication code generation circuitry to apply a second code generation algorithm to generate, from a first authentication code retrieved from the non-trusted memory, a reference second authentication code. Further, the authentication code generation circuitry may be arranged to generate a comparison second authentication code by first generating a comparison first authentication code from the read block of data, and then applying the second code generation algorithm using the comparison first authentication code in order to generate the comparison second authentication code. The memory security circuitry may then be arranged to verify the integrity of the read block of data by comparing the reference second authentication code to the comparison second authentication code. By such an approach, irrespective of whether the authentication code for a particular block of data is stored as a second authentication code in the trusted storage or a first authentication code in the non-trusted memory, the memory security circuitry can be arranged to verify the integrity of the read block of data based on a second authentication code and a comparison second authentication code.

In implementations where the authentication code generation circuitry generates the second authentication code by applying an algorithm that uses as one input the first authentication code, this can give rise to some benefits when authentication codes are migrated from the non-trusted memory to the trusted storage. In particular, at that point in time, a second authentication code needs to be generated for storing in the trusted storage, and when adopting the above technique the corresponding second authentication code can be generated for storing in the trusted storage without reference to the associated block of data. Hence, there is no need to access the non-trusted memory in order to retrieve the block of data in question, and instead the second authentication code can be generated using the equivalent first authentication code as an input (note that the reverse process is not possible). This can be useful in situations where a sequence of first authentication codes are read from the non-trusted memory, enabling a corresponding sequence of equivalent second authentication codes to be generated and stored within the trusted storage without needing to retrieve the associated blocks of data from the non-trusted memory. An example of this is prefetching of first authentication codes from non-trusted memory into trusted memory cache, explicitly or implicitly by reading a whole cache line containing multiple first authentication codes.

The authentication code generation circuitry can be arranged in a variety of ways, and may for example include entirely separate circuit elements for generating the first authentication code and for generating the second authentication code. However, in one example arrangement the authentication code generation circuitry is arranged to apply a first process to generate the first authentication code and a second process to generate the second authentication code, the first and second processes sharing a common initial part.

In one particular example arrangement, the common initial part comprises the performance of a hash function on the block of data using an input key to produce an intermediate value. The authentication code generation circuitry is then arranged to complete the first process by encrypting the intermediate value using first secret data in order to generate the first authentication code, and is arranged to complete the second process by encrypting the intermediate value using second secret data in order to generate the second authentication code. This can provide some efficiency benefits by avoiding the need to replicate the hash function within both the circuitry used to generate the first authentication code and the circuitry used to generate the second authentication code.

Further, it can produce some additional benefits in situations where it is desired to generate the second authentication code after the first authentication code has already been generated, for example when the authentication code is to be migrated from the non-trusted memory to the trusted storage. In particular, in such a scenario the authentication code generation circuitry may be arranged to generate the second authentication code by decrypting the first authentication code using the first secret data in order to generate the intermediate value, and then encrypting the intermediate value using the second secret data in order to generate the second authentication code. Hence, there is no need to retrieve the block of data to which the authentication code relates in order to generate the second authentication code, and instead the second authentication code can be generated directly from the intermediate value obtained by decrypting the first authentication code.

Particular examples will now be described with reference to the Figures.

FIG. 1 schematically illustrates an example of a data processing system, which comprises an integrated circuit (IC) or System-on-Chip (SoC) 10 which includes at least one processor core 15 for executing program instructions to carry out data processing operations. Whilst FIG. 1 only shows one processor core, in some cases the SoC 10 may comprise multiple processors. Each processor core or processor core cluster may have a cache 20 (or multiple levels of cache 20, 25). A memory controller 35 acts as memory access circuitry for controlling access to an off-chip memory 40 which is on a separate integrated circuit from the SoC 10. While accesses to data on-chip may be difficult to tamper with by an attacker, the edge of the SoC may act as a trust boundary and any data passing beyond that boundary may be vulnerable to attack by intercepting data on the physical channel 37 between the memory controller 35 and the off-chip memory 40, or by reading or modifying the data whilst it is stored in the off-chip memory 40.

It should be noted that, while FIG. 1 shows an example where the trust boundary corresponds to the edge of the SoC, in other cases there could be trust boundaries within a SoC (or between stacked layers of a three dimensional integrated circuit) which could expose data beyond the trust boundary to potential attacks.

The SoC 10 may include a memory security unit 30 provided for protecting data stored in the off-chip memory 40 from a malicious adversary who has physical access to the system and the ability to observe and/or replay the data or code being exchanged between the microprocessor and the off-chip memory 40. The memory 40 stores not only the data 45 to be protected, but also message authentication codes (MACs) 50 used when seeking to verify the integrity of the data.

The memory security unit 30 may include encryption/decryption circuitry 55 for encrypting data being written to the off-chip memory 40 and decrypting data read back from the off-chip memory. This provides privacy by preventing a malicious observer from seeing in the clear the data being read from or stored onto the off-chip memory 40. Encryption keys used by the encryption and decryption circuitry may be stored within an on-chip memory (not shown in FIG. 1) on the System-on-Chip or within the memory security unit 30 itself. Any known technique may be used for the encryption and decryption, and any known approach for protecting the encryption keys can be used. It should be noted that the encryption of data is not a requirement when using the authentication code mechanism described herein, and if desired the authentication code mechanism can be employed in respect of plaintext (i.e. unencrypted data).

The memory security unit 30 also includes an authentication unit 60 for generating the message authentication codes, and for performing a verification process to verify the integrity of the data 45 using associated message authentication codes. In particular, at the time a block of data is written to the non-trusted memory 40, the authentication unit 60 can be used to generate an associated MAC, with the block of data then being written to the non-trusted memory, and with the generated MAC also being stored for future reference. As will be discussed in more detail later, the generated MAC can either be stored within the set of MACs 50 within the non-trusted memory 40, or a reduced size MAC can instead be generated and stored within a trusted storage 65 provided in association with the memory security unit 30. The trusted storage can take a variety of forms, but in one implementation may be formed as a cache.

Then, when the data is subsequently read from the non-trusted memory 40 the authentication unit 60 can generate a comparison MAC from the retrieved data, which can then be compared against the stored MAC for that data in order to check the integrity of the data. In particular, the data will only be determined to pass the data integrity check if the MAC generated by the authentication unit 60 from the read data matches the stored MAC for that data.

The MACs can be generated in a variety of ways, but in one example implementation may be generated using one-way cryptographic functions such as AES-GCM or SHA-256, which use functions which make it computationally infeasible for an attacker to guess the authentication code associated with a particular data value by brute force when a secret key used to generate the authentication code is unknown.

As discussed earlier, the MACs generated by the authentication unit 60 will typically be chosen to be large enough to make the risk of MAC collision very low, and hence inhibit the ability of an attacker to make use of MAC collision as a mechanism for altering the data 45 stored in the non-trusted memory 40. Given that a MAC needs to be generated for every block of data stored within the non-trusted memory 40 that needs to be protected, the set of MACs created will be relatively large, and there will typically be insufficient memory within the SoC 10 to store all of the generated MACs. Hence, it is necessary for the MACs 50 to be stored in the non-trusted memory 40 and the size of the MACs generated will hence be chosen to be large enough to ensure that the risk of MAC collision is very low, such that the attacker cannot make use of MAC collision to tamper with the memory contents, even though the attacker will have access to the data 45 and the MACs 50.

Typically, an on-chip cache might be used to store a subset of the MACs 50 to allow for improved speed of access to those MACs, and hence for example the trusted storage 65 could be used to store a subset of the MACs. However, instead of merely using the on-chip cache to store a subset of the MACs stored externally in the non-trusted memory 40, in accordance with the techniques described herein a different approach is taken whereby the authentication unit 60 is used to generate different authentication codes, dependent on whether the authentication code is to be stored externally in the non-trusted memory 40 or within the Soc 10, for example within the trusted storage 65. In particular, when the MAC is stored within the trusted storage 65, this means that an attacker cannot access that information. As a result, it has been realised that when verification is performed using a MAC stored within the trusted storage 65 the attacker is not aware of possible collisions and, in turn, the exact time at which a replacement attack should be performed. This means that the size of the MAC used in instances where the MAC is stored within the trusted storage 65 provided within the SoC 10 can be reduced relative to the size of MAC employed when the MAC is stored within the non-trusted memory 40, without compromising the data integrity verification process. In particular, whilst a reduced size MAC does increase the occurrence of MAC collisions, an attacker can make no use of that increased chance of collision in situations where the reduced size MAC is only stored within the trusted storage 65, and is not stored externally within the non-trusted memory 40.

Hence, in accordance with the techniques described herein, when the authentication unit 60 is generating a MAC for a block of data, in a situation where that MAC is to be stored within the trusted storage 65, the authentication unit 60 is arranged to employ an authentication code generation process that generates a reduced size MAC, whereas in situations where the authentication unit 60 is generating a MAC that is to be stored as one of the MACs 50 within the non-trusted memory 40, it instead employs a different authentication code generation process that generates a full size MAC for storing in the non-trusted memory 40. Further, the different authentication code generation processes are arranged so that the reduced size MAC generated for storing within the trusted storage 65 is not inferable from the corresponding full size MAC that may be generated and stored within the non-trusted memory 40.

Figure 2A:
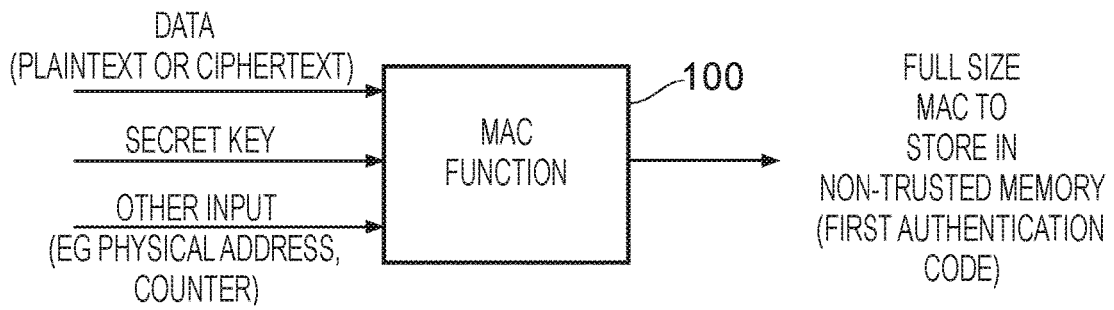
FIGS. 2A to 2C schematically illustrate techniques that may be used to generate first and second authentication codes in accordance with one example arrangement.

FIG. 2A illustrates how a full size MAC may be generated by the authentication unit 60 for storing in the non-trusted memory 40, such a full size MAC also being referred to herein as a first authentication code. A MAC function 100 may be employed as an algorithm to generate the first authentication code from a plurality of inputs. In particular, the data for which the MAC is to be generated is input, and that may be the original unencrypted data, or the encrypted version of the data (also referred to as ciphertext). A secret key is also provided for use in generating the authentication code from the data. Further, in some implementations other input information may also be provided such as the physical address corresponding to the data, and optionally some input information that forms a unique value that will not be repeated in time, for example a counter value. Separate counters may be maintained for each block of data, and that counter may be incremented or updated each time the corresponding block of data is written to. Hence, the counter can be viewed as a nonce, i.e. an arbitrary number that is used once, and in particular whose value will change each time the corresponding data block is written to, as a result of which the generated authentication code will change each time the data is written to. The physical address may be concatenated with the counter in order to form an input to the MAC function 100 along with the secret key and the data (the concatenated physical address and counter being used, for example, with the secret key as inputs to a function that generates a one-time pad (OTP)).

The MAC function 100 can take a variety of forms, and indeed may take additional inputs in addition to the three inputs shown in FIG. 2A, dependent on the implementation. As one example, the MAC function may be implemented by a combination of a hash function and an encryption function, and in such instances the MAC function may also receive an input key used by the hash function to generate a hash value from the input data, which is then encrypted using the secret key and the other input formed from the physical address and the counter.

Figure 2B:
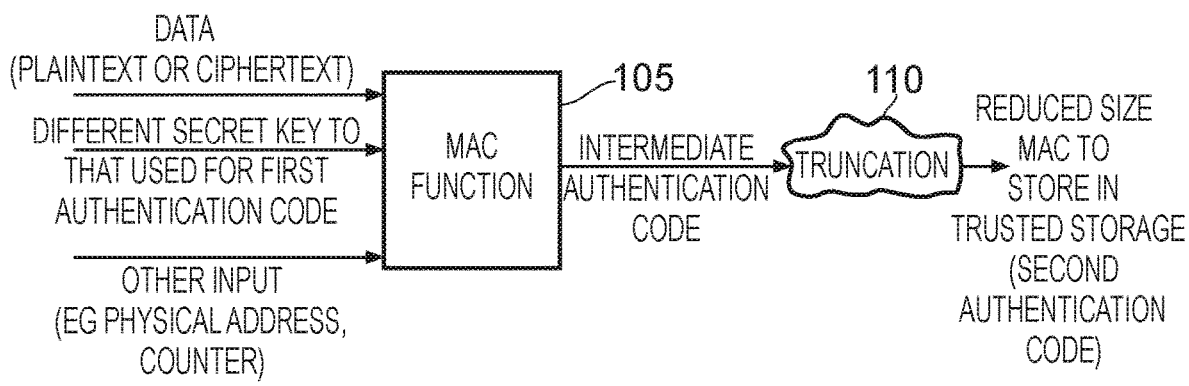

FIG. 2B shows the function that may be used to generate the reduced size MAC to store in the trusted storage, also referred to herein as a second authentication code. In this example, the MAC function 105 also receives the data as input (either plain text or ciphertext), just as the MAC function 100 of FIG. 2A did in order to generate the full size MAC. The MAC function 105 also receives a secret key, but in this example implementation the secret key is different to that used for the first authentication code, as a result of which a reduced size MAC will not be inferable from knowledge of the equivalent full size MAC generated using the MAC function 100. As with the example of FIG. 2A, the MAC function 105 can receive other input, such as a concatenation of a physical address and a counter.

The MAC function 105 may be a different MAC function to the MAC function 100, or may essentially be the same MAC function, such that the only difference is that a different secret key is used by the MAC function 105 to the secret key used by the MAC function 100. Application of the MAC function 105 results in the generation of an intermediate authentication code. In some instances, this may directly be of the required reduced size, but in other example implementations, for example where the MAC function 105 is essentially the same MAC function as the MAC function 100, a further process may be needed to produce a reduced size MAC from the intermediate authentication code. For example, as shown in FIG. 2B, a truncation process 110 can be used to discard certain bits of the intermediate authentication code in order to produce the second authentication code of the required reduced size.

Whilst the sizes of the full size MAC and the reduced size MAC may be varied dependent on implementation, in one example implementation a full size MAC may be 64 bits in length, whilst the equivalent reduced size MAC may be only 16 or 32 bits. It will hence be appreciated that the number of authentication codes that can be stored within the trusted storage 65 is significantly increased relative to an approach where merely a subset of the full size MACs are cached within the trusted storage 65. Alternatively, for a desired number of authentication codes to be stored in the trusted storage 65, the size of the trusted storage itself can be reduced significantly relative to an approach where the trusted storage is merely used to cache a certain subset of the full size MACs 50 stored in the non-trusted memory 40.

Figure 2C:
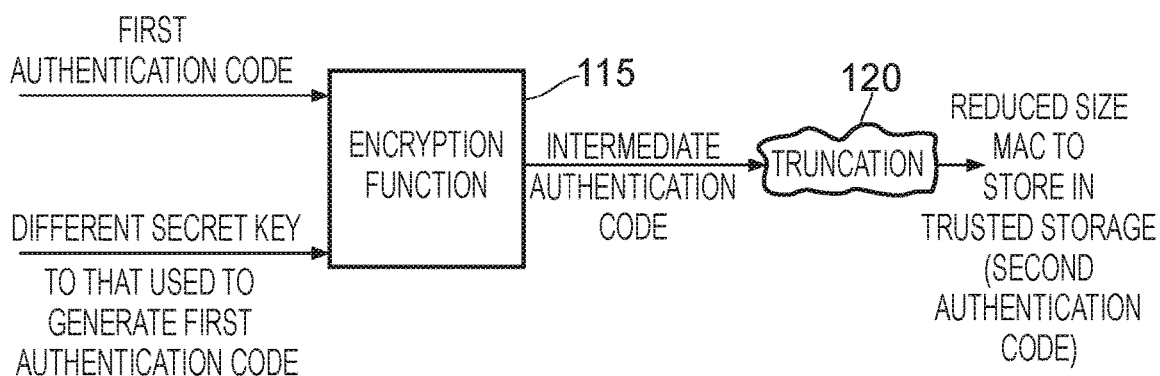

Whilst in the example of FIG. 2B, the block of data to which the second authentication code relates is provided as an input to the MAC function 105, in an alternative implementation the second authentication code may be generated from the first authentication code produced as an output of the MAC function 100 shown in FIG. 2A. This is illustrated in FIG. 2C, where an encryption function 115 uses the first authentication code and a different secret key to that used to generate the first authentication code as inputs. In such an implementation, it may be considered unnecessary to also provide the physical address and counter as an input, since that information will already have been taken into account when generating the first authentication code. The encryption function 115 will then produce an intermediate authentication code, and as with the approach of FIG. 2B a truncation process 120 can be used if necessary to discard certain bits of the intermediate authentication code so as to produce a second authentication code of the required reduced size.

Figure 3:
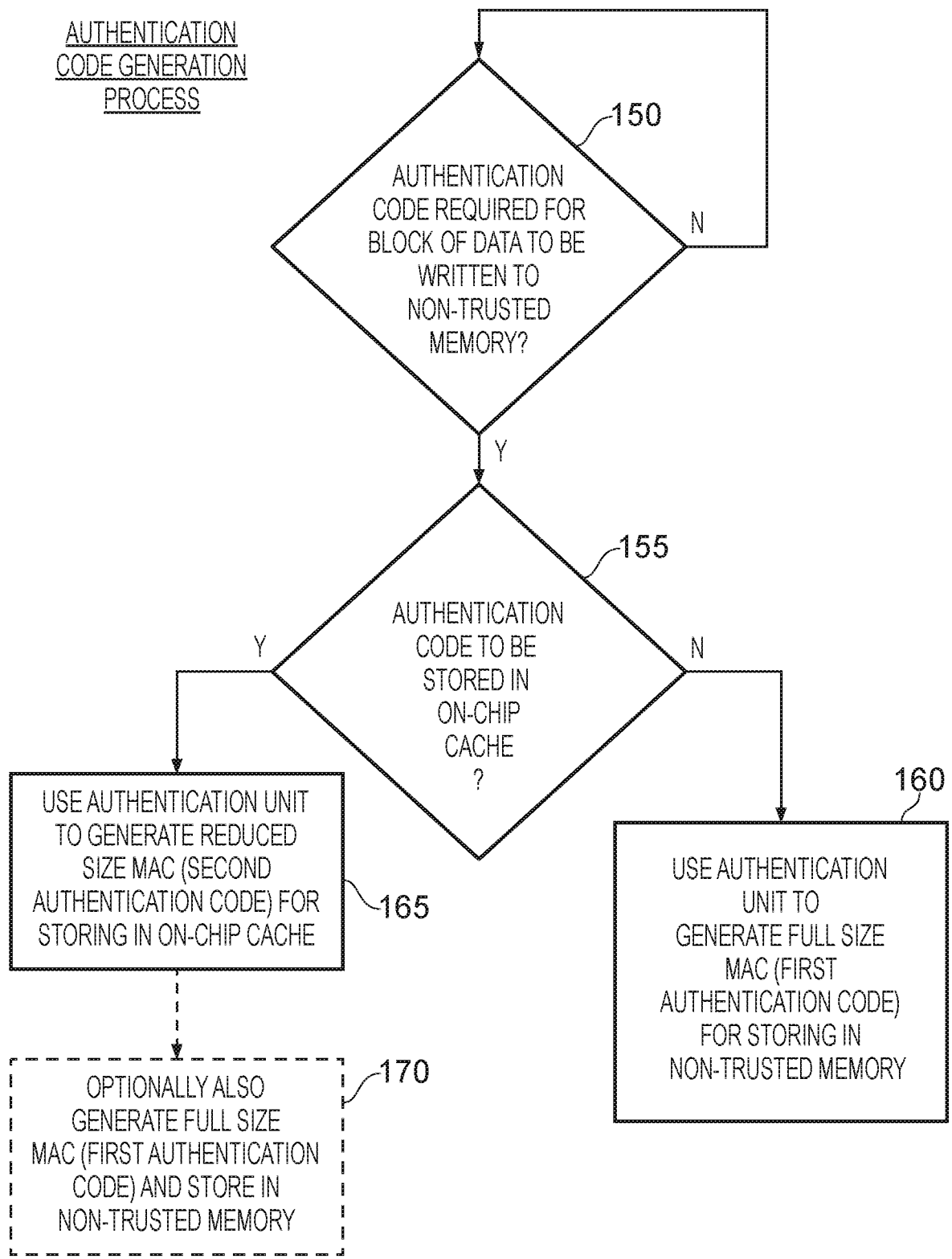
FIG. 3 is a flow diagram illustrating the authentication code generation process employed in one example arrangement.

FIG. 3 is a flow diagram illustrating the authentication code generation process employed in one example implementation by the authentication unit 60 of FIG. 1. At step 150, it is determined whether an authentication code is required for a block of data to be written to the non-trusted memory 40, and on determining that there is a block of data to be written for which an authentication code is required the process proceeds to step 155. It should be noted that there may be some blocks of data written to the non-trusted memory 40 that do not need to be subjected to the verification process, and hence it will not necessarily always be the case that every block of data written to the non-trusted memory will need to have a MAC generated in association with it.

When at step 150 it is determined that an authentication code is required, it is then determined at step 155 whether the authentication code is to be stored into the on-chip cache, for instance the trusted storage 65 shown in FIG. 1. In one example implementation it may always be the case that the authentication code is initially generated as a reduced size authentication code for storing in the on-chip cache, with an older authentication code stored within the on-chip cache being evicted as necessary to make room for the newly generated authentication code. In that event, the process will always follow the yes path shown in FIG. 3. However, in a more general implementation, it may be decided that for some regions of memory, or at least for certain blocks of data, full size MACs will be generated for storing within the non-trusted memory rather than reduced size MACs for storing within the on-chip cache.

If it is determined that the authentication code is to be stored in the on-chip cache, then the process proceeds to step 165 where the authentication unit 60 is used to generate the required reduced size MAC for storing in the on-chip cache, using for example either the MAC function 105 of FIG. 2B or the encryption function 115 of FIG. 2C. It will be noted that, at least in situations where the encryption function 115 is used, the process performed by the authentication unit at step 165 will also involve the generation of the first authentication code (i.e. the full size MAC) as that is needed as an input for the encryption function.

As shown by the optional step 170, the authentication unit may also be arranged to generate the full size MAC and store that in the non-trusted memory 40. Hence, irrespective of whether the MAC function 105 of FIG. 2B is used or the encryption function 115 of FIG. 2C is used at step 165, the authentication unit may in any event be arranged to generate the full size MAC using the MAC function 100, and to store that full size MAC in the non-trusted memory. As will be discussed in more detail later, this can give rise to a simplification if in due course it is necessary to evict the reduced size MAC generated at step 165 from the on-chip cache, since at that point the corresponding full size MAC already exists within the non-trusted memory and accordingly does not need to be recreated.

If at step 155 it is decided that the authentication code is not to be stored in the on-chip cache, then the process proceeds to step 160 where the authentication unit 60 is used to generate the full size MAC for storing in the non-trusted memory 40, for example using the MAC function 100 shown in FIG. 2A.

Figure 4:
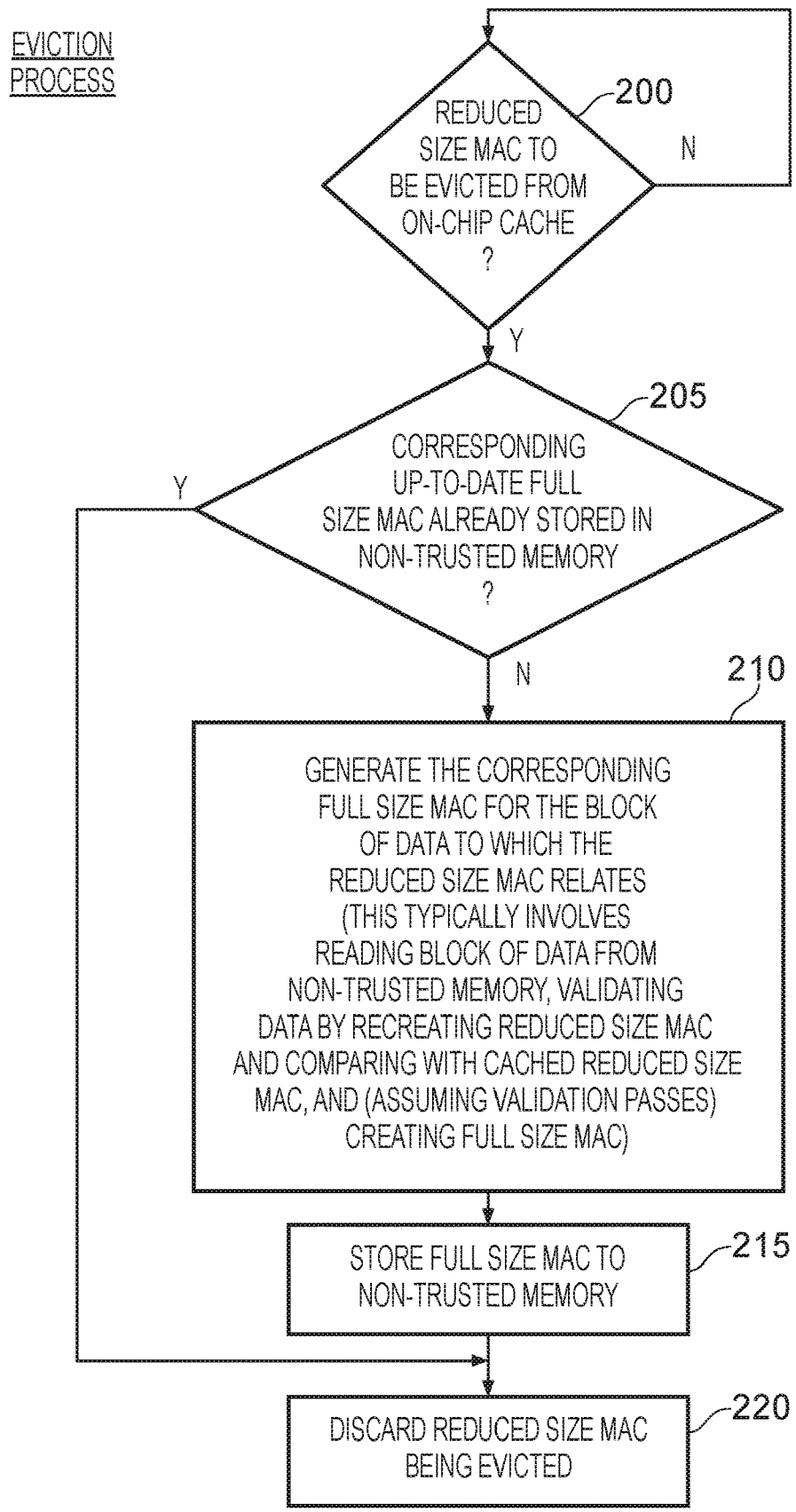
FIG. 4 is a flow diagram illustrating an eviction process employed in one example arrangement.

FIG. 4 is a flow diagram illustrating the eviction process that may be employed when it is necessary to evict a reduced size MAC from the on-chip cache 65. As discussed earlier, this may arise as a result of needing to free up space to receive a newly generated reduced size MAC, or indeed may occur as part of general cache maintenance operations. When at step 200 it is determined that a reduced size MAC does need to be evicted from the on-chip cache, it is then determined at step 205 whether the corresponding up to date full size MAC is already stored in the non-trusted memory. As will be apparent from the earlier discussed FIG. 3, this will be the case if step 170 was performed at the time each reduced size MAC was generated, since in that event it will be seen that the on-chip cache 65 effectively operates as a write through cache, in that for each reduced size MAC stored in the on-chip cache 65, the corresponding full size MAC is generated at the same time and stored within the non-trusted memory 40.

If the corresponding up to date full size MAC is already stored in the non-trusted memory 40, then the process proceeds to step 220 where it is merely necessary to discard the reduced size MAC being evicted.

However, if the corresponding up to date full size MAC is not already stored in the non-trusted memory 205, then the process proceeds to step 210 where the corresponding full size MAC is generated for the block of data to which the reduced size MAC relates. It should be noted that, as part of this process, it will typically first be considered necessary to perform a verification check on the block of data, to check that the block of data has not been altered since the reduced size MAC was generated. Accordingly, to perform the verification check, the block of data may be read from the non-trusted memory, and then a comparison reduced size MAC recreated from that read data (using for example the MAC function 105 of FIG. 2B) for comparison against the cached reduced size MAC stored in the on-chip cache 65. Assuming this results in a match, then the block of data is considered to be correct, and accordingly the process can proceed to create a full size MAC from that read data, for example using the MAC function 100 of FIG. 2A.

Following step 210, then at step 215 the full size MAC can then be stored to the non-trusted memory 40, whereafter at step 220 the reduced size MAC can be discarded.

Figure 5:
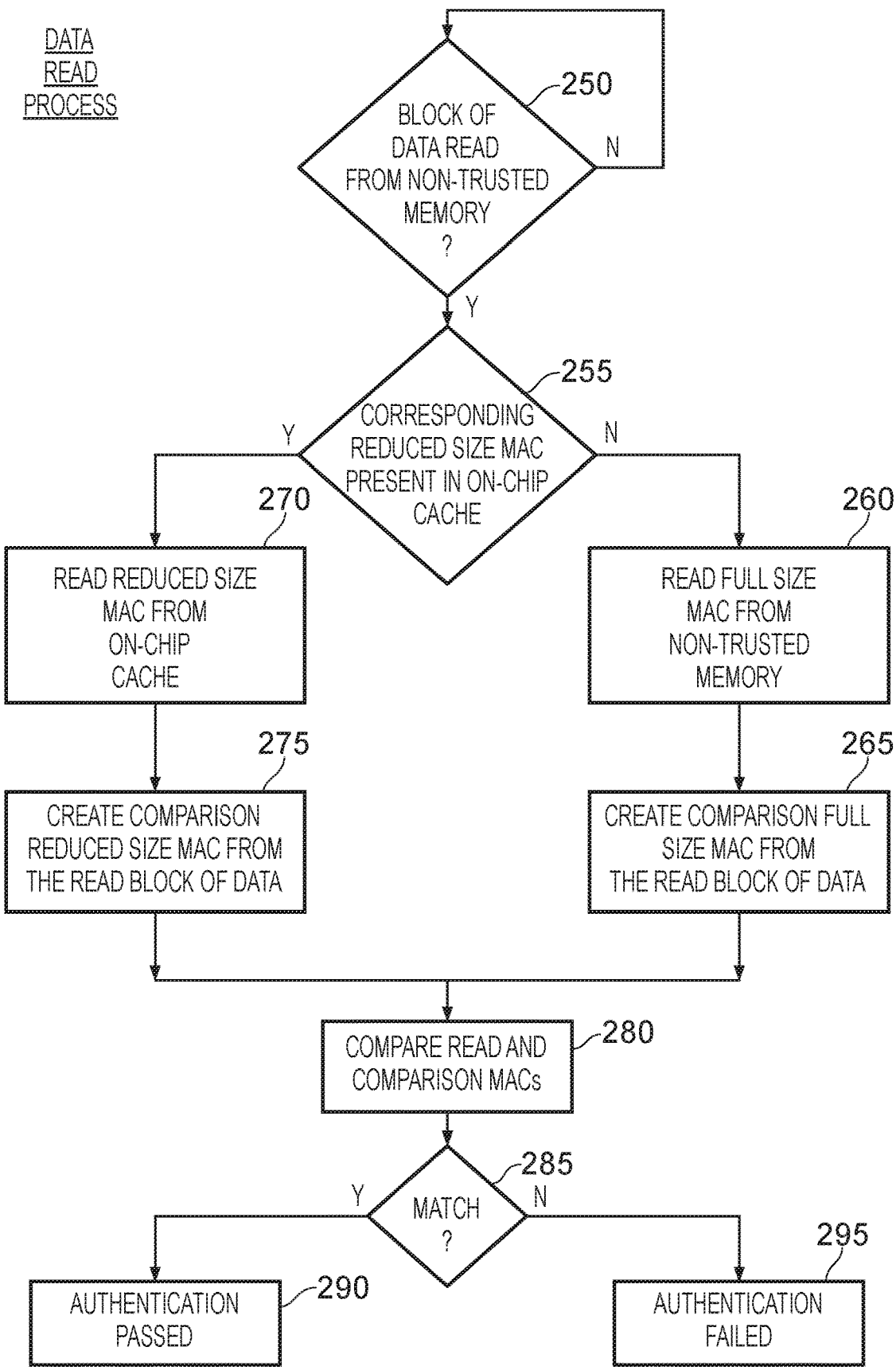
FIG. 5 is a flow diagram illustrating a data read process employed in one example arrangement.

FIG. 5 is a flow diagram illustrating a data read process employed in one example implementation. When at step 250 it is determined that a block of data is to be read from non-trusted memory, it is then determined at step 255 whether the corresponding reduced size MAC is present in the on-chip cache. For example, for each stored MAC, whether in the on-chip cache 65 or in the non-trusted memory 40, there may be stored an address indication used to identify the address of the block of data to which that MAC relates, and accordingly it can be determined whether the on-chip cache stores a reduced size MAC relating to the memory address of the block of data. However, in an alternative implementation such an address indicator may not be required. For example, the MACs may be stored in a fixed memory region and the address of a MAC may be inferred from the address of the data block that the MAC relates to. For instance, considering one very specific example implementation where it is assumed that the MAC region is contiguous and starts at address 0x100000000, if a data block is at address 0x8000 and a MAC is 8 times smaller than a data block, then the MAC address for that data block is 0x100000000+0x1000.

If the corresponding reduced size MAC is present in the on-chip cache, then at step 270 that reduced size MAC is read from the on-chip cache, and then at step 275 a comparison reduced size MAC is created from the read block of data. At step 275, either the approach of FIG. 2B or the approach of FIG. 2C can be used in order to generate the comparison reduced size MAC, but it will be appreciated that if the approach of FIG. 2C is used, then the authentication unit 60 will also need to generate the full size MAC, for example using the MAC function 100 of FIG. 2A, so that that full size MAC can be input to the encryption function 115.

Thereafter, at step 280, both the read MAC and the comparison MAC can be compared, and if a match is detected at step 285, then at step 290 authentication is considered to have been passed, whereas otherwise at step 295 authentication is considered to have failed.

If the corresponding reduced size MAC is not present in the on-chip cache, then it is necessary to read the full size MAC from non-trusted memory at step 260. Thereafter, at step 265, a comparison full size MAC is created from the read block of data, for example using the MAC function 100 of FIG. 2A. The process then proceeds to step 280 where the earlier described comparison process is performed in order to determine whether the authentication is passed or failed.

Figure 6:
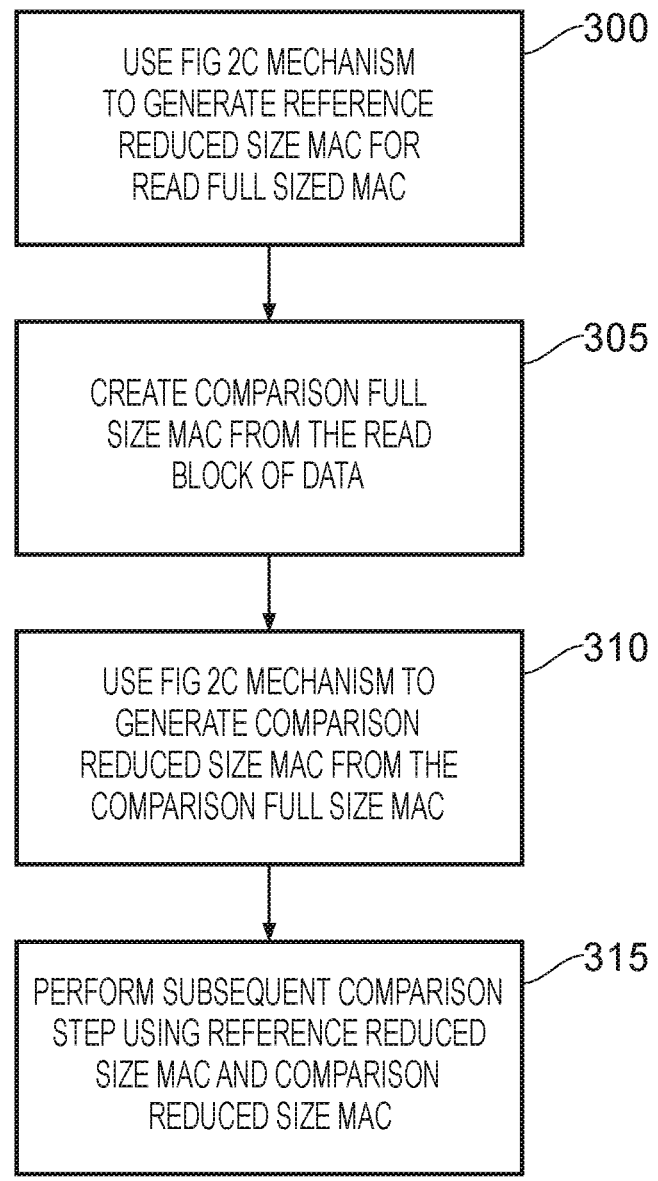
FIG. 6 is a flow diagram illustrating a sequence of steps that may be performed as an alternative to step 265 of FIG. 5, in one example arrangement.

In one example implementation, the authentication unit 60 can be provided with comparison elements to enable the comparison process of step 280 to be performed both in relation to reduced size MACs and full size MACs. However, if desired, in an alternative implementation the comparison circuitry may be configured so that the comparison is always performed in respect of reduced size MACs. In that event, step 265 of FIG. 5 can be modified as shown in FIG. 6. In particular, FIG. 6 shows a sequence of steps that can be performed in order to implement step 265 of FIG. 5 such that once step 280 is reached, reduced size MACs are used in the comparison process.

At step 300, the FIG. 2C mechanism is used to generate a reference reduced size MAC for the read full size MAC obtained at step 260. Then, at step 305 a comparison full size MAC is created from the read block of data, for example using the MAC function 100 of FIG. 2A.

Then, at step 310, the FIG. 2C mechanism is again used to generate a comparison reduced size MAC from the comparison full size MAC generated at step 305.

Thereafter, as indicated by step 315, the subsequent comparison operations can be performed using the reference reduced size MAC and the comparison reduced size MAC, and hence steps 280 to 295 will be implemented using the same circuitry, irrespective of whether step 280 is reached via performance of steps 270, 275 or via performance of steps 260, 265.

As mentioned earlier, a reduced size MAC can either be generated from the block of data to which the reduced size MAC relates or from the full size MAC generated for that block of data, for example using either the approach of FIG.

Figure 7:
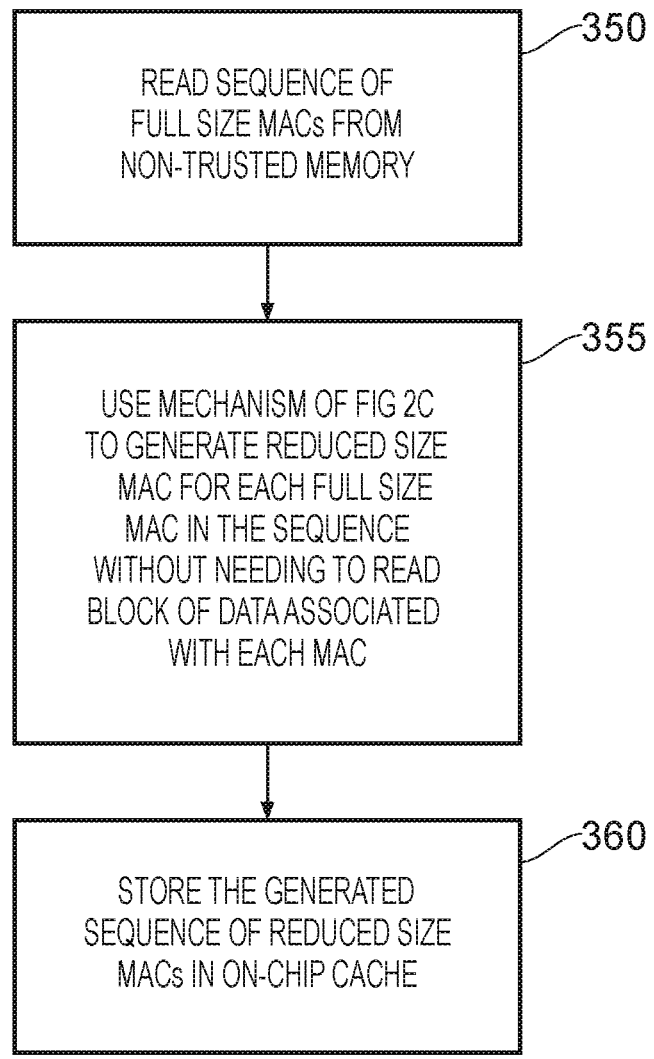
FIG. 7 is a flow diagram illustrating how reduced size authentication codes may be generated for a sequence of full size authentication codes read from the non-trusted memory, in accordance with one example arrangement.

2B or the approach of FIG. 2C, respectively. However, in instances where the approach of FIG. 2C is used, and hence a reduced size MAC is generated from a full size MAC, this can give rise to certain benefits in situations where full size MACs are migrated from the non-trusted memory 40 to the trusted storage 65. In particular, it may be the case that a sequence of full size MACs are retrieved from the non-trusted memory at certain points in time. For instance, when a block of data is read, and hence the corresponding MAC needs to be obtained, it may be that that corresponding MAC is stored in the non-trusted memory 40, and the read granularity may be such that a plurality of MACs stored in the non-trusted memory 40 are retrieved at that point in time, for example a cache line's worth of MACs. Accordingly, at step 350 of FIG. 7 it may be the case that a sequence of full size MACs are read from the non-trusted memory.

Whilst only one of those MACs will be relevant to the current block of data that has been read, it may be considered appropriate at that time to seek to cache the equivalent reduced size MAC for each of those full size MACs within the sequence read at step 350. If the approach of FIG. 2B were used, this would only be possible if each block of data to which the reduced size MACs relate is read from memory. However, if the FIG. 2C approach is adopted, then the reduced size MACs can be generated directly from the sequence of full size MACs read at step 350. In particular, as indicated by step 355, the mechanism of FIG. 2C can be used in respect of each full size MAC in the sequence in order to generate the corresponding reduced size MAC, without needing to read the corresponding block of data associated with each MAC. At step 360, the generated sequence of reduced size MACs can then be stored in the on-chip cache 65.

Figure 8A:
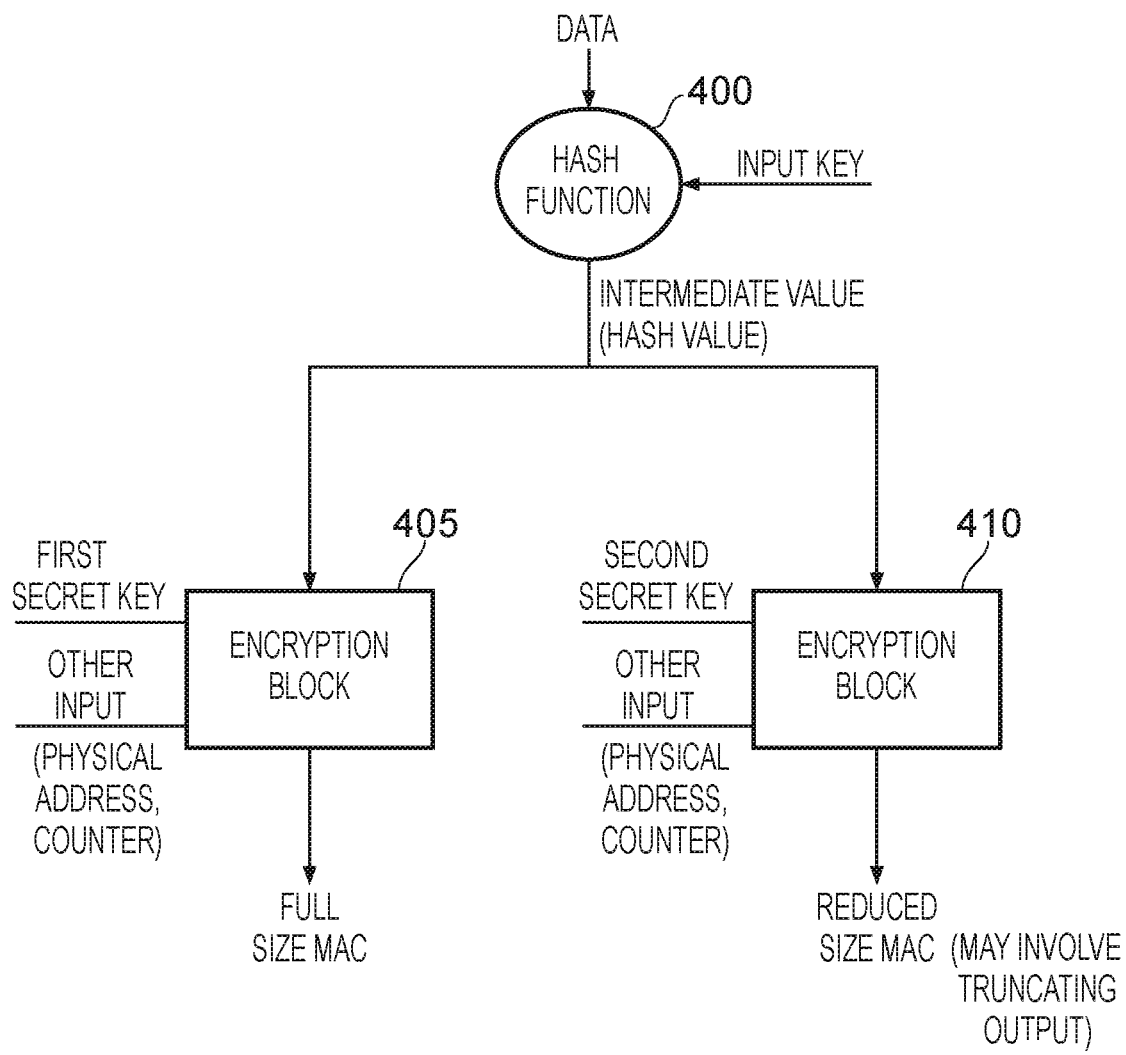
FIGS. 8A and 8B illustrate one form of authentication code generation circuitry that may be employed in a particular example arrangement.

The authentication code generation circuitry provided as part of the authentication unit 60 may be implemented in a variety of ways. For example, the circuitry used to generate full size MACs may be entirely separate from the circuitry used to generate the reduced size MACs. However, in an alternative implementation at least part of the circuitry may be shared. A particular example of such an approach is shown in FIG. 8A. In this implementation, each of the MAC functions 100, 105 of FIGS. 2A and 2B are implemented by the combination of a hash function and an encryption function. Whilst the encryption functions may be kept separate, the hash function may be shared. Hence, the hash function 400 may operate on the input block of data, using a provided input key in order to generate an intermediate value, also referred to as a hash value. That hash value can then be provided to both the encryption block 405 used as part of the MAC function 100 and the encryption block 410 used as part of the MAC function 105. The encryption block 405 will receive the first secret key and any other appropriate input information, for example the physical address and counter, and similarly the encryption block 410 will receive the second secret key and any other appropriate input information, for example the physical address and counter.

Application of the encryption algorithm by the encryption block 405 will result in the generation of a full size MAC, whilst application of the encryption algorithm by the encryption block 410 will result in the generation of a reduced size MAC. As will be apparent from the earlier discussed FIG. 2B, a truncation process may also be used to discard certain bits of the resulting MAC produced by the encryption block 410 in order to produce a MAC of the required reduced size.

Figure 8B:
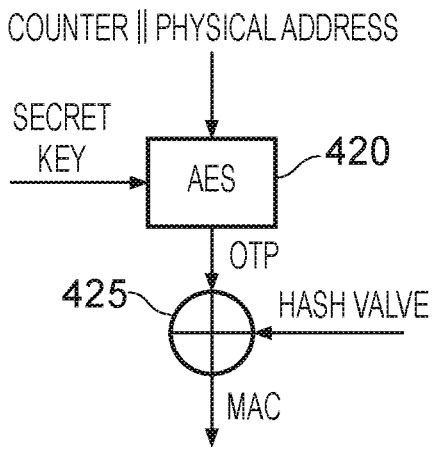

The encryption blocks 405, 410 can be organised in a variety of ways, but one example arrangement is shown in FIG. 8B. An Advanced Encryption Standard (AES) encryption block 420 can be used to generate an OTP using the secret key and a concatenation of the counter and physical address. An XOR component 425 can then be used to perform an XOR function using as inputs the OTP generated by the AES block 420 and the hash value output by the hash function 400, this resulting in the generation of a MAC. In situations where the reduced size MAC is being generated using the encryption block 410, then it may be necessary to incorporate a truncation function in respect of the output from the XOR block 425 in order to generate the reduced size MAC.

Figure 9:
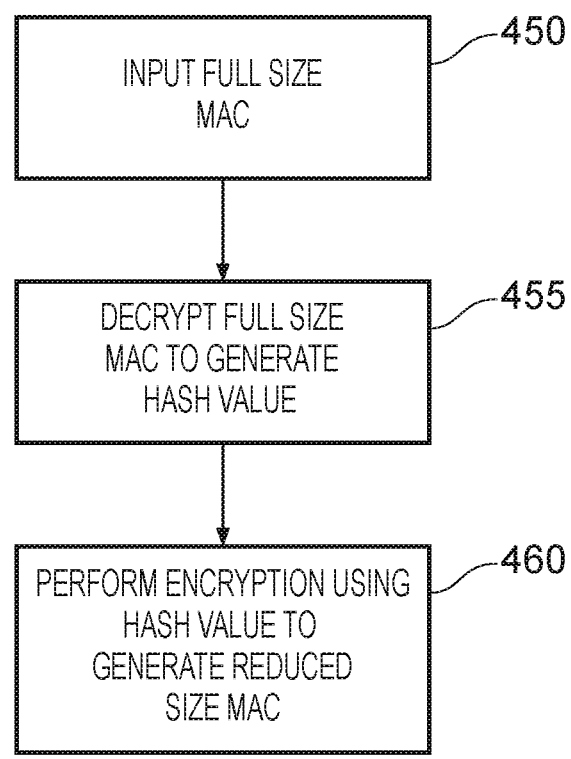
FIG. 9 illustrates how a reduced size authentication code may be generated from an input full size authentication code in one example arrangement, when employing the authentication code circuitry illustrated in FIGS. 8A and 8B.

When adopting an arrangement such as shown in FIGS. 8A and 8B, this can enable a reduced size MAC to be generated from the full size MAC without needing to re-read the block of data to which the MAC relates, through reference instead to the intermediate hash value. In particular, it will be appreciated from FIG. 8A that the combination of the hash function 400 and the encryption block 410 can implement the MAC function 105 of FIG. 2B, and the reduced size MAC is generated from the block of data input to the hash function. However, in situations where the full size MAC has already been generated, and in due course it is desired to produce the corresponding reduced size MAC, for example due to the MAC being migrated from the non-trusted memory 40 to the on-chip cache 65, then the reduced size MAC can be generated without needing to re-read the data from non-trusted memory. This process is illustrated in FIG. 9. At step 450, the full size MAC is input, whereafter at step 455 the full size MAC is decrypted in order to generate the hash value. This can be achieved by performing an XOR function using the OTP and the full size MAC, with the output then being the hash value. Thereafter, at step 460, the hash value can be provided to the encryption block 410 in order to generate the reduced size MAC.

Through use of the techniques described herein, more efficient utilisation can be made of an on-chip cache used to store MACs used to verify the integrity of data stored in a non-trusted memory 40. Whereas MACs of a certain size are generated for storing in the non-trusted memory 40, a different authentication code generation process can be used to generate the equivalent MACs in a situation where those MACs are to be stored within the on-chip cache, and those equivalent MACs can be of a reduced size relative to the size of the MACs that would be stored in the non-trusted memory 40. Hence, for a given size of on-chip storage, more MACs can be stored than would otherwise be the case if the on-chip cache were merely used to cache a subset of the MACs stored in the non-trusted memory 40. Alternatively, if it is desired to be able to store a specific number of MACs on-chip, then the size of the on-chip cache can be reduced given that the MACs generated for on-chip storage are of a reduced size relative to the MACs generated for storage in the non-trusted memory.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   memory access circuitry to control access to data stored in a non-trusted memory;
   memory security circuitry to verify integrity of data stored in the non-trusted memory; and
   a trusted storage;
   the memory security circuitry having authentication code generation circuitry to generate authentication codes to be associated with the data stored in the non-trusted memory, for use when verifying the integrity of the data;
   wherein the authentication code generation circuitry is arranged, for a given block of data for which an associated authentication code is to be generated:
      to generate as the associated authentication code a first authentication code with a first size to be compared with a first comparison authentication code to verify the integrity of the given block of data when the associated authentication code is to be stored in the non-trusted memory, and
      to generate as the associated authentication code a second authentication code with a second size less than the first size to be compared with a second comparison authentication code to verify the integrity of the given block of data when the associated authentication code is to be stored in the trusted storage.

2. The apparatus as claimed in claim 1, wherein:
   the apparatus resides within a domain of trust, and the non-trusted memory is outside of the domain of trust; and
   the authentication code generation circuitry is arranged to generate the second authentication code in a manner that ensures that the second authentication code is not inferable from information residing outside of the domain of trust.

3. The apparatus as claimed in claim 1, wherein:
   the authentication code generation circuitry is arranged to employ an authentication code generation process that is dependent on which of the first authentication code and the second authentication code is being generated, so as to ensure that the second authentication code generated for the given block of data is not inferable from visibility of the first authentication code for that given block of data.

4. The apparatus as claimed in claim 3, wherein the authentication code generation process is dependent on an input item of secret data, and the authentication code generation circuitry is arranged to cause a first item of secret data to be used when generating the first authentication code and a second item of secret data to be used when generating the second authentication code, wherein the second item of secret data is different to the first item of secret data.

5. The apparatus as claimed in claim 1, wherein the authentication code generation circuitry is arranged to generate the second authentication code by applying an algorithm that uses as one input the given block of data.

6. The apparatus as claimed in claim 1, wherein the authentication code generation circuitry is arranged to generate the second authentication code by applying an algorithm that uses as one input the first authentication code.

7. The apparatus as claimed in claim 1, wherein the authentication code generation circuitry is arranged to generate the second authentication code by employing an algorithm that generates an intermediate authentication code that is of the first size, and then applying a further process to produce the second authentication code of the second size from the intermediate authentication code.

8. The apparatus as claimed in claim 7, wherein the further process is a truncation process such that the second authentication code is a truncated version of the intermediate authentication code.

9. The apparatus as claimed in claim 1, wherein the trusted storage is organised as a cache to store second authentication codes for a subset of the blocks of data stored in the non-trusted memory.

10. The apparatus as claimed in claim 9, wherein the authentication code generation circuitry is arranged, when generating the second authentication code to be stored in the trusted storage, to also generate the first authentication code and store the generated first authentication code in the non-trusted memory, whereby on eviction of any second authentication code from the trusted storage, the corresponding first authentication code is present in the non-trusted memory.

11. The apparatus as claimed in claim 9, wherein the authentication code generation circuitry is arranged, when generating the second authentication code to be stored in the trusted storage, to not store the first authentication code in the non-trusted memory, and on eviction of any second authentication code from the trusted storage, the authentication code generation circuitry is arranged to generate the corresponding first authentication code for storage in the non-trusted memory.

12. The apparatus as claimed in claim 9, wherein:
   the memory security circuitry is arranged, when reading a block of data from the non-trusted memory, to determine whether the associated authentication code is stored as a second authentication code in the trusted storage, and if so to verify the integrity of the read block of data using the second authentication code in the trusted storage.

13. The apparatus as claimed in claim 1, wherein:
   the memory security circuitry is arranged, when reading a block of data from the non-trusted memory, and on determining that the associated authentication code is not stored as a second authentication code in the trusted storage, to retrieve the first authentication code from the non-trusted memory and to employ the retrieved first authentication code when verifying the integrity of the read block of data.

14. The apparatus as claimed in claim 13, wherein:
   the memory security circuitry is arranged to employ the authentication code generation circuitry to:
      apply a second code generation algorithm to generate from the retrieved first authentication code a reference second authentication code; and
      generate a comparison second authentication code by first generating a comparison first authentication code from the read block of data, and then applying the second code generation algorithm using the comparison first authentication code in order to generate the comparison second authentication code;

wherein the memory security circuitry is arranged to verify the integrity of the read block of data by comparing the reference second authentication code to the comparison second authentication code.

15. The apparatus as claimed in claim 1, wherein:
the authentication code generation circuitry is arranged to generate the second authentication code by applying an algorithm that uses as one input the first authentication code; and
the authentication circuitry is responsive to a first authentication code being retrieved from the non-trusted memory, to generate the corresponding second authentication code for storing in the trusted storage without reference to the associated block of data.

16. The apparatus as claimed in claim 1, wherein:
the authentication code generation circuitry is arranged to apply a first process to generate the first authentication code and a second process to generate the second authentication code, the first and second processes sharing a common initial part.

17. The apparatus as claimed in claim 16, wherein:
the common initial part comprises the performance of a hash function on the block of data using an input key to produce an intermediate value;
the authentication code generation circuitry is arranged to complete the first process by encrypting the intermediate value using first secret data in order to generate the first authentication code; and
the authentication code generation circuitry is arranged to complete the second process by encrypting the intermediate value using second secret data in order to generate the second authentication code.

18. The apparatus as claimed in claim 17, wherein the authentication code generation circuitry is arranged to generate the second authentication code by decrypting the first authentication code using the first secret data in order to generate the intermediate value, and then encrypting the intermediate value using the second secret data in order to generate the second authentication code.

19. A method of controlling access to data stored in a non-trusted memory, comprising:
employing authentication code generation circuitry to generate authentication codes to be associated with the data stored in the non-trusted memory;
verifying the integrity of the data with reference to the authentication codes;
providing a trusted storage; and
arranging the authentication code generation circuitry, for a given block of data for which an associated authentication code is to be generated:
to generate as the associated authentication code a first authentication code with a first size to be compared with a first comparison authentication code to verify the integrity of the given block of data when the associated authentication code is to be stored in the non-trusted memory, and
to generate as the associated authentication code a second authentication code with a second size less than the first size to be compared with a second comparison authentication code to verify the integrity of the given block of data when the associated authentication code is to be stored in the trusted storage.

20. An apparatus comprising:
memory access means for controlling access to data stored m a non-trusted memory;
memory security means for verifying integrity of data stored in the non-trusted memory; and
a trusted storage;
the memory security means having authentication code generation means for generating authentication codes to be associated with the data stored in the non-trusted memory, for use when verifying the integrity of the data;
wherein the authentication code generation means is responsive to a given block of data for which an associated authentication code is to be generated:
for generating as the associated authentication code a first authentication code with a first size to be compared with a first comparison authentication code to verify the integrity of the given block of data when the associated authentication code is to be stored in the non-trusted memory, and
for generating as the associated authentication code a second authentication code with a second size less than the first size to be compared with a second comparison authentication code to verify the integrity of the given block of data when the associated authentication code is to be stored in the trusted storage.

* * * * *